Patented July 27, 1926.

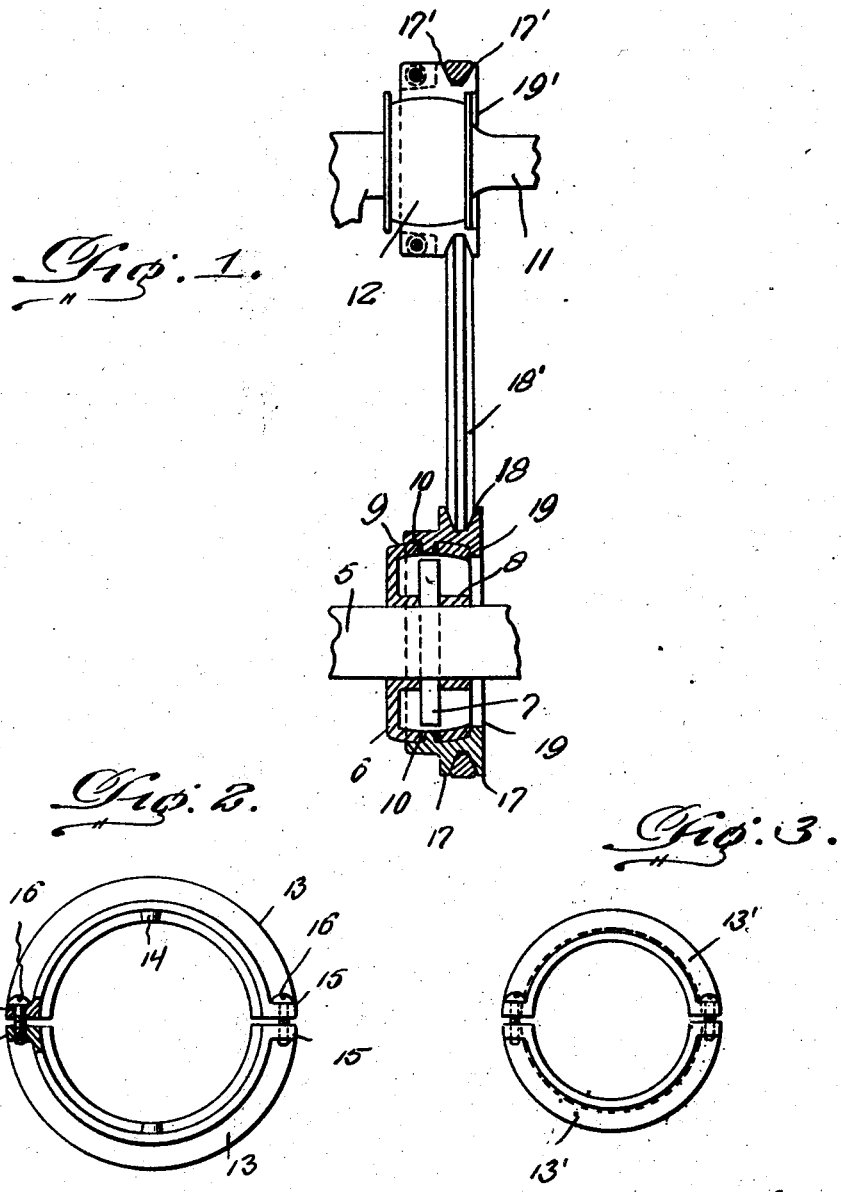

1,593,936

UNITED STATES PATENT OFFICE.

IRVIN R. GOODWIN, OF SIOUX CITY, IOWA.

BELT ADAPTER FOR PULLEYS.

Application filed October 28, 1925. Serial No. 65,373.

This invention relates generally to means whereby the cooling fans of internal combustion engines may be rotated for particular reference to means whereby the flat belt receiving type of pulleys usually found in Ford automobiles may be adapted to the reception of the V-type belt in order that the fan may be successfully operated and whereby the liability of the belt disengaging from the pulleys is minimized.

The primary object of the invention is to provide an adapter construction that may be readily and rigidly associated with the flat belt receiving type of pulleys in Ford and certain other automobiles without requiring any great skill on the part of the workman.

A further and important object is to provide an adapter construction that may be manufactured and marketed at relatively low cost and that will prove highly efficient in use.

With the foregoing and other objects in view as the nature of the invention is better understood, the same comprises the novel form, combination and arrangement of the parts as hereinafter more fully described and shown in the accompanying drawing and claimed.

In the drawing wherein like reference characters indicate corresponding parts throughout the several views:—

Figure 1 is a detail vertical section through my adapter construction, the elements thereof being shown as actually associated with the pulleys now generally employed in association with the engine crank shaft and fan shaft.

Fig. 2 is a rear side elevation partly in cross section of the adapter construction for association with the crank shaft pulley, and Fig. 3 is a similar view of the adapter construction for association with the fan shaft pulley.

Now having particular reference to the drawing, there is shown fragmentarily at 5 the forward end of an internal combustion engine crank shaft that projects outwardly of the crank case and upon which is mounted a flangeless somewhat barrel-shaped belt pulley 6 and secured to the shaft through the medium of the pin 7 attached through alined openings in the sleeve portion 8 of the pulley and said shaft, the rim 9 of the pulley being formed with diametrically opposed openings 10—10 that are in alinement with the openings of the sleeve portion, in order that said pin 7 may be properly inserted.

The motor fan shaft is fragmentarily shown as at 11 and mounted thereon in alinement with the crank shaft pulley 6 is a flange pulley 12 that is also of general barrel-shape as shown.

My invention consists of means adapted for association with the pulleys 6 and 12 on the crank shaft and fan shaft respectively in order that the usual wide flat belts may be dispensed with and a conventional V-type belt employed in lieu thereof, which type of belt is advantageous in use and successful in operation.

The structural elements of my invention adapted for association with the crank shaft pulley 6 constitutes the provision of a pulley construction for disposition upon the periphery of the pulley 6. The same comprises a pair of half sections 13—13, the internal faces of which are of a contour adaptable for positioning upon the exterior face of the rim of the pulley 6 at the forward end thereof. Each half section 13 is formed upon its inner face and intermediate its end with a dowel pin 14 for engagement within the proper opening 10 of the rim of the pulley 6, Figs. 1 and 2.

Furthermore, at the opposite end of each half section, there are formed right angular lugs 15—15 that are formed with threaded openings in order that attaching screws 16—16 may be threaded through those in mating relation.

The half sections are formed at their forward edges upon the outer surface thereof with spaced flanges 17—17, the inner edges of which are inclined in order that when the half sections 13—13 are secured in position around the pulley 6, a substantially V-shaped groove 18 will be provided for the training of a V-shaped belt 18' therein.

The purpose of forming the circumferentially extending V-shaped groove at the forward edge portions of the complementary sections is to provide a means whereby the V-shaped fan belts will not strike the primer casing which is mounted adjacent the pulley in the manner well known in the art.

The forward edges of the half sections are formed with inwardly extending flanges 19—19 that provide a circumferential shoulder at the forward edge of the sections when they have been disposed upon the pulley 6, the same having abutting relation with the edge of the pulley rim to cooperate with the pins 10—10 in the proper positioning of this portion of the adapter upon the pulley.

The construction of the adapter for association with the fan shaft pulley 12 is similar in practically all respects to the construction for association with the pulley 6, that is the same comprises half sections 13'—13' that cooperate to provide a pulley upon the pulley 12, said half sections being also formed with the flanges 17'—17' to provide the V-shaped groove in vertical alinement with the groove of the lower adapter construction and through which is also trained the V-shaped belt 18. In this instance, however, the half sections 13'—13' are rabbeted at their forward edges for providing a groove 19' in which engages the forward flange of the pulley 12, it being obvious that prior to the securing of the half sections upon the pulley, the sections are moved into engagement with said forward flange in order that the proper relationship of this adapter construction may be brought about and in order to limit any forward sliding movement of the half sections upon the pulley and also in order that the groove provided for the belt will be in alinement with the groove provided in the lower adapter construction.

The advantages and construction of an invention of this character will be readily appreciated by those skilled in the art and even though I have herein shown and described the most preferred embodiment of the invention with which I am at this time familiar, it is nevertheless to be understood that minor changes may be made therein without departing from the spirit and scope of the appended claim.

Having thus described my invention, what I claim as new and desire to secure by Letters Patent is:—

An adapter of the class described comprising a pair of complementary half sections, means for detachably securing the same around the periphery of a flangeless pulley, spaced flanges formed upon the outer peripheral faces of said sections adjacent the forward edges thereof to provide a V-type belt receiving groove, and a dowel pin extending inwardly from each of said sections adjacent the rear edges thereof, the rim portion of said pulley being provided with a pair of diametrically opposed openings to receive the respective dowel pins whereby the adapter is held on the rim of the pulley against lateral movement.

In testimony whereof I affix my signature.

IRVIN R. GOODWIN.